(12) United States Patent
Barton et al.

(10) Patent No.: US 9,721,287 B2
(45) Date of Patent: Aug. 1, 2017

(54) METHOD AND SYSTEM FOR INTERACTING WITH A USER IN AN EXPERIMENTAL ENVIRONMENT

(71) Applicant: Shazam Investments Limited, London (GB)

(72) Inventors: Christopher Jacques Penrose Barton, San Diego, CA (US); Philip Georges Inghelbrecht, Berkeley, CA (US); Dheeraj Shankar Mukherjee, London (GB); Avery Li-Chun Wang, Palo Alto, CA (US)

(73) Assignee: Shazam Investments Limited, London (GB)

( * ) Notice: Subject to any disclaimer, the term of this patent is extended or adjusted under 35 U.S.C. 154(b) by 635 days.

(21) Appl. No.: 14/230,061

(22) Filed: Mar. 31, 2014

(65) Prior Publication Data

US 2014/0214532 A1    Jul. 31, 2014

Related U.S. Application Data

(63) Continuation of application No. 13/193,205, filed on Jul. 28, 2011, now Pat. No. 8,688,600, which is a (Continued)

(51) Int. Cl.
*G06Q 99/00* (2006.01)
*G06Q 30/06* (2012.01)
(Continued)

(52) U.S. Cl.
CPC ......... *G06Q 30/0625* (2013.01); *G06Q 30/02* (2013.01); *G06Q 30/0207* (2013.01);
(Continued)

(58) Field of Classification Search
CPC ................. G10H 7/02; G06Q 99/00
(Continued)

(56) References Cited

U.S. PATENT DOCUMENTS 4,230,990 A   10/1980  Lert, Jr. et al.
4,450,531 A    5/1984  Kenyon et al.
(Continued)

FOREIGN PATENT DOCUMENTS

EP      0480010     4/1992
EP     0 955 592   11/1999
(Continued)

OTHER PUBLICATIONS

Anon., RD-440032, "MP3 Box for Audio Sets," Dec. 2000.*
(Continued)

*Primary Examiner* — Nicholas D Rosen
(74) *Attorney, Agent, or Firm* — McDonnell Boehnen Hulbert & Berghoff LLP

(57) ABSTRACT

A method and system for provides a user with an ability to capture a sample of an experiential environment and deliver that sample to an interactive service to trigger one or more predetermined events. In exemplary embodiments of the invention such triggered events include the delivery of information and services to the user, the execution of tasks and instructions by the service on the user's behalf, communication events; surveillance events and other control-oriented events that are responsive to the user's wishes. In other exemplary embodiments of the invention, the triggered events include transaction-oriented events, entertainment events, and events associated with enhancements to human ability or function.

29 Claims, 2 Drawing Sheets

Related U.S. Application Data continuation of application No. 12/204,526, filed on Sep. 4, 2008, now Pat. No. 8,015,123, which is a continuation of application No. 11/188,385, filed on Jul. 25, 2005, now abandoned, which is a continuation of application No. 09/734,949, filed on Dec. 12, 2000, now abandoned.

(51) Int. Cl.
 *G06Q 30/02* (2012.01)
 *G10H 7/02* (2006.01)

(52) U.S. Cl.
 CPC ..... *G06Q 30/0217* (2013.01); *G06Q 30/0251* (2013.01); *G06Q 30/0277* (2013.01); *G06Q 30/0601* (2013.01); *G06Q 30/0633* (2013.01); *G06Q 30/0641* (2013.01); *G06Q 99/00* (2013.01); *G10H 7/02* (2013.01)

(58) Field of Classification Search
 USPC ............................................. 84/603; 705/500
 See application file for complete search history.

(56) References Cited

U.S. PATENT DOCUMENTS

| | | | |
|---|---|---|---|
| 4,682,370 A | 7/1987 | Matthews | |
| 4,739,398 A | 4/1988 | Thomas et al. | |
| 4,843,562 A | 6/1989 | Kenyon et al. | |
| 4,918,730 A * | 4/1990 | Schulze ................. | G10L 15/00 455/2.01 |
| 5,046,004 A | 9/1991 | Tsumura et al. | |
| 5,125,024 A | 6/1992 | Gokcen et al. | |
| 5,134,719 A | 7/1992 | Mankovitz | |
| 5,210,820 A | 5/1993 | Kenyon | |
| 5,436,653 A | 7/1995 | Ellis et al. | |
| 5,437,050 A | 7/1995 | Lamb et al. | |
| 5,465,240 A | 11/1995 | Mankovitz | |
| 5,574,962 A | 11/1996 | Fardeau et al. | |
| 5,577,249 A | 11/1996 | Califano | |
| 5,581,658 A | 12/1996 | O'Hagan et al. | |
| 5,581,800 A | 12/1996 | Fardeau et al. | |
| 5,661,787 A | 8/1997 | Pocock | |
| 5,674,743 A | 10/1997 | Ulmer | |
| 5,721,827 A | 2/1998 | Logan et al. | |
| 5,740,230 A | 4/1998 | Vaudreuil | |
| 5,787,334 A | 7/1998 | Fardeau et al. | |
| 5,822,729 A | 10/1998 | Glass | |
| 5,828,314 A | 10/1998 | Park | |
| 5,842,162 A | 11/1998 | Fineberg | |
| 5,918,213 A | 6/1999 | Bernard et al. | |
| 5,918,223 A | 6/1999 | Blum et al. | |
| 5,952,597 A | 9/1999 | Weinstock et al. | |
| 5,963,916 A | 10/1999 | Kaplan | |
| 5,973,252 A | 10/1999 | Hildebrand | |
| 5,987,525 A | 11/1999 | Roberts et al. | |
| 5,991,737 A | 11/1999 | Chen | |
| 6,018,724 A | 1/2000 | Arent | |
| 6,061,680 A | 5/2000 | Scherf et al. | |
| 6,121,530 A | 9/2000 | Sonoda | |
| 6,154,773 A | 11/2000 | Roberts et al. | |
| 6,161,132 A | 12/2000 | Roberts et al. | |
| 6,233,682 B1 | 5/2001 | Fritsch | |
| 6,288,991 B1 | 9/2001 | Kajiyama et al. | |
| 6,389,403 B1 | 5/2002 | Dorak, Jr. | |
| 6,389,538 B1 | 5/2002 | Gruse et al. | |
| 6,398,245 B1 | 6/2002 | Gruse et al. | |
| 6,418,421 B1 | 7/2002 | Hurtado et al. | |
| 6,437,227 B1 | 8/2002 | Theimer | |
| 6,476,306 B2 | 11/2002 | Huopaniemi et al. | |
| 6,496,744 B1 | 12/2002 | Cook | |
| 6,502,194 B1 | 12/2002 | Berman et al. | |
| 6,505,160 B1 | 1/2003 | Levy et al. | |
| 6,553,129 B1 | 4/2003 | Rhoads | |
| 6,574,609 B1 | 6/2003 | Downs et al. | |
| 6,578,051 B1 | 6/2003 | Mastronardi et al. | |
| 6,587,127 B1 * | 7/2003 | Leeke ................. | G06Q 20/123 715/733 |
| 6,587,837 B1 | 7/2003 | Spagna et al. | |
| 6,606,744 B1 | 8/2003 | Mikurak | |
| 6,611,812 B2 | 8/2003 | Hurtado et al. | |
| 6,647,417 B1 | 11/2003 | Hunter et al. | |
| 6,671,818 B1 | 12/2003 | Mikurak | |
| 6,681,029 B1 | 1/2004 | Rhoads | |
| 6,785,671 B1 | 8/2004 | Bailey et al. | |
| 6,792,007 B1 | 9/2004 | Hamada et al. | |
| 6,911,592 B1 | 6/2005 | Futamase et al. | |
| 6,928,414 B1 | 8/2005 | Kim | |
| 6,941,274 B1 | 9/2005 | Ramachandran et al. | |
| 6,941,275 B1 | 9/2005 | Swierczek | |
| 6,954,859 B1 | 10/2005 | Simerly et al. | |
| 6,966,065 B1 | 11/2005 | Kitazato et al. | |
| 7,174,293 B2 | 2/2007 | Kenyon et al. | |
| 7,190,971 B1 | 3/2007 | Kawamoto | |
| 7,194,752 B1 | 3/2007 | Kenyon et al. | |
| 7,228,280 B1 | 6/2007 | Scherf et al. | |
| 7,277,766 B1 | 10/2007 | Khan et al. | |
| 7,444,353 B1 | 10/2008 | Chen et al. | |
| 7,853,664 B1 | 12/2010 | Wang et al. | |
| 7,870,088 B1 | 1/2011 | Chen et al. | |
| 8,015,123 B2 | 9/2011 | Barton et al. | |
| 8,509,397 B2 | 8/2013 | Chen et al. | |
| 8,688,600 B2 * | 4/2014 | Barton ................. | G06Q 30/02 705/500 |
| 8,725,829 B2 * | 5/2014 | Wang ................. | G06Q 30/06 704/231 |
| 2001/0014868 A1 * | 8/2001 | Herz ................. | G06Q 10/0637 705/14.38 |
| 2002/0007306 A1 | 1/2002 | Granger et al. | |
| 2002/0023020 A1 * | 2/2002 | Kenyon ................. | G06Q 30/02 704/231 |
| 2002/0072982 A1 * | 6/2002 | Barton ................. | G06Q 30/02 705/14.1 |
| 2002/0083060 A1 | 6/2002 | Wang et al. | |
| 2005/0267817 A1 * | 12/2005 | Barton ................. | G06Q 30/02 705/26.1 |
| 2006/0174348 A1 | 8/2006 | Rhoads et al. | |
| 2008/0028223 A1 | 1/2008 | Rhoads | |
| 2011/0314132 A1 | 12/2011 | Barton et al. | |
| 2012/0064870 A1 | 3/2012 | Chen et al. | |
| 2013/0138442 A1 | 5/2013 | Wang et al. | |

FOREIGN PATENT DOCUMENTS

| | | |
|---|---|---|
| EP | 0 982 578 | 3/2000 |
| EP | 1 443 769 | 8/2004 |
| JP | 09 293083 | 11/1997 |
| JP | 09293083 A * | 11/1997 |
| WO | WO 91/17540 | 11/1991 |
| WO | WO 93/07689 | 4/1993 |
| WO | WO 93/22875 | 11/1993 |
| WO | WO 94/00842 | 1/1994 |
| WO | WO 97/33273 | 9/1997 |
| WO | WO 97/40491 | 10/1997 |
| WO | WO 99/18518 | 4/1999 |
| WO | WO 99/48099 | 9/1999 |

OTHER PUBLICATIONS

Anon., "Hungarian Radio Calls Echelon System Surveillance by Big Brother and Siblings", BBC Monitoring International Reports, Mar. 26, 2000.

Anon., "Iterated Systems Develops VHS Quality Digital Video", Newsbytes News Network, Mar. 5, 1997.

Chou, et al., "Music Databases: Indexing Techniques and Implementation", Proceedings of International Workshop on Multi-Media Database Management Systems, Aug. 1996, 46-53.

Foote, J. T., "Content-Based Retrieval of Music and Audio", Proceedings of the SPIE, Nov. 3, 1997, 138-147.

Gonzalez, R. et al., "Content-Based Retrieval of Audio", ATNAC, 1996, 1-6.

(56) References Cited

OTHER PUBLICATIONS

Henley, J., "Greater Spying by Government Worries Europeans Worst Ahead Rights Groups Say", Arizona Republic, Final Chaser Edition, Feb. 20, 1999, A34.
Jacso, P., "Finding Music on the Web: Part 2," Information Today, vol. 14, No. 6, pp. 42-45, Jun. 1997.
Liu, S.A., "Landmark Detection for Distinctive Feature-Based Speech Recognition", Journal of Acoustical Society of America, American Institute of Physics, Nov. 1, 1996, 3417-3430.
Liu, Z., et al., "Content Based Idexing and Retrieval by Example in Audio", 2000 IEEE International Conference, Multimedia and Expo, 877-880, XP 010513149.
Mack, A.M., "Going Local" Adweek, Jul. 10, 2000, 41(28), 38-39.
Milne, S., "MI5's Secret War", New Statesman & Society, Nov. 25, 1994, 7, 330, 18.
Rolland, P-Y. et al., "Musical Content-Based Retrieval: An Overview of the Melodiscov Approach and System", Proceedings of ACM Multimedia 99, Proceedings of ACM Multimedia, 1999, 81-84, XP002250746.
TDB-ACC-No: NNRD444159, Micropayment Scheme, IBM Technical Disclosure Bulletin, Apr. 1, 2001, UK, Issue 444, 652.
Tseng, Y-H., "Content Based Retrieval for Music Collections", Proceedings of SIGIR, 22nd International Conference on Research and Development in Information Retrieval, 1999, 176-182.
Wold, E. et al., Content-Based Classification, Search, and Retrieval of Audio, IEEE Multimedia, Fall 1996, 3(3), 27-36.
Young, J., "You're Playing my Song", Forbes, Jul. 5, 1993, 114-115.
Bond, P. "A Star is Born Nationally, Seeking Stellar CD Sales," Hollywood Reporter, Nov. 1, 1999, vol. 35, No. 13.
Tetschner, W., "Tool Kits Ease Applications Development for PC-Based Voice-Processing", PC Week, Jun. 7, 1988, vol. 5, No. 23, C22.
Anon, "Music Marketers Target Specific Consumers with Ever More Refined Telephone Sampling Strategies", Entertainment Marketing Letter, EPM Communications, Inc., vol. 6, No. 3, Mar. 1, 1993.
Anon, RD-440032, "MP3 Box for Audio Sets," Dec. 2000.

* cited by examiner

METHOD AND SYSTEM FOR INTERACTING WITH A USER IN AN EXPERIMENTAL ENVIRONMENT

CROSS-REFERENCE TO RELATED APPLICATIONS

The present application is a continuation U.S. patent application Ser. No. 13/193,205, filed July 28, 2011 (now U.S. Pat. No. 8,688,600), which is a continuation of U.S. patent application Serial No. 12/204,526 filed Sep. 4, 2008 (now U.S. Pat. No. 8,015,123), which is a continuation of co-pending U.S. patent application Ser. No. 11/188,385 filed July 25, 2005, which is a continuation of U.S. patent application Ser. No. 09/734,949, filed Dec. 12, 2000, both entitled "Method And System For Interacting With A User In An Experiential Environment," the contents of all of which are hereby incorporated by reference in their entireties.

BACKGROUND

The present invention relates generally to methods and apparatuses for interacting with a user, and more particularly to a method and apparatus for interacting with a user in an experiential environment.

Methods and systems for interacting with a user exist. Examples include computer graphical user interfaces, computer pointing and clicking devices, sometimes referred to as "mice" to name just a few. These devices fail to take advantage of the experiential environment in which a user often finds oneself and therefore lack the ability to provide rich information to a computer as to the user's desires.

A wide variety of media is available through many delivery channels to a large audience. Rapidly evolving communication technologies such as telephony, television, prerecorded media including CDs and DVD, radio, and the Internet in combination with traditional media such as print and visual arts operate to create a vast experiential environment for many people. Such environments are further enriched with other sensory experiences such as those coming from live performances, speeches and lectures, and routine day-to-day interactions with others. Ambient conditions like the sights and sounds of a bustling city street or the buzz of insects and chirping of birds in a more idyllic rural setting provide additional dimensions to the experiential environment.

In the midst of these experiential environments, users are often desirous of communicating with a computer or other automated processing device. Yet these devices cannot take advantage of the state of the user, which otherwise provides valuable information to one attempting to ascertain the needs of the user.

The present invention is therefore directed to the problem of developing a method and system for interacting with a user in a way that takes advantage of the rich and stimulating experiential environment to which the user is exposed to simplify the processing of user requests.

SUMMARY OF THE INVENTION

The present invention solves these and other problems by providing a method and apparatus for interacting with a user that employs a captured sample of an experiential environment in which the user exists as a command to trigger subsequent events.

A method and system for interacting with the user includes capturing a sample of an experiential environment and delivering that sample to an interactive service to trigger one or more predetermined events. In exemplary embodiments of the invention such triggered events include the delivery of information and services to the user, the execution of tasks and instructions by the service on the user's behalf, communication events, surveillance events and other control-oriented events that are responsive to the user's wishes. In other exemplary embodiments of the invention, the triggered events include transaction-oriented events, entertainment events, and events associated with enhancements to human ability or function.

DETAILED DESCRIPTION

Figure 1:
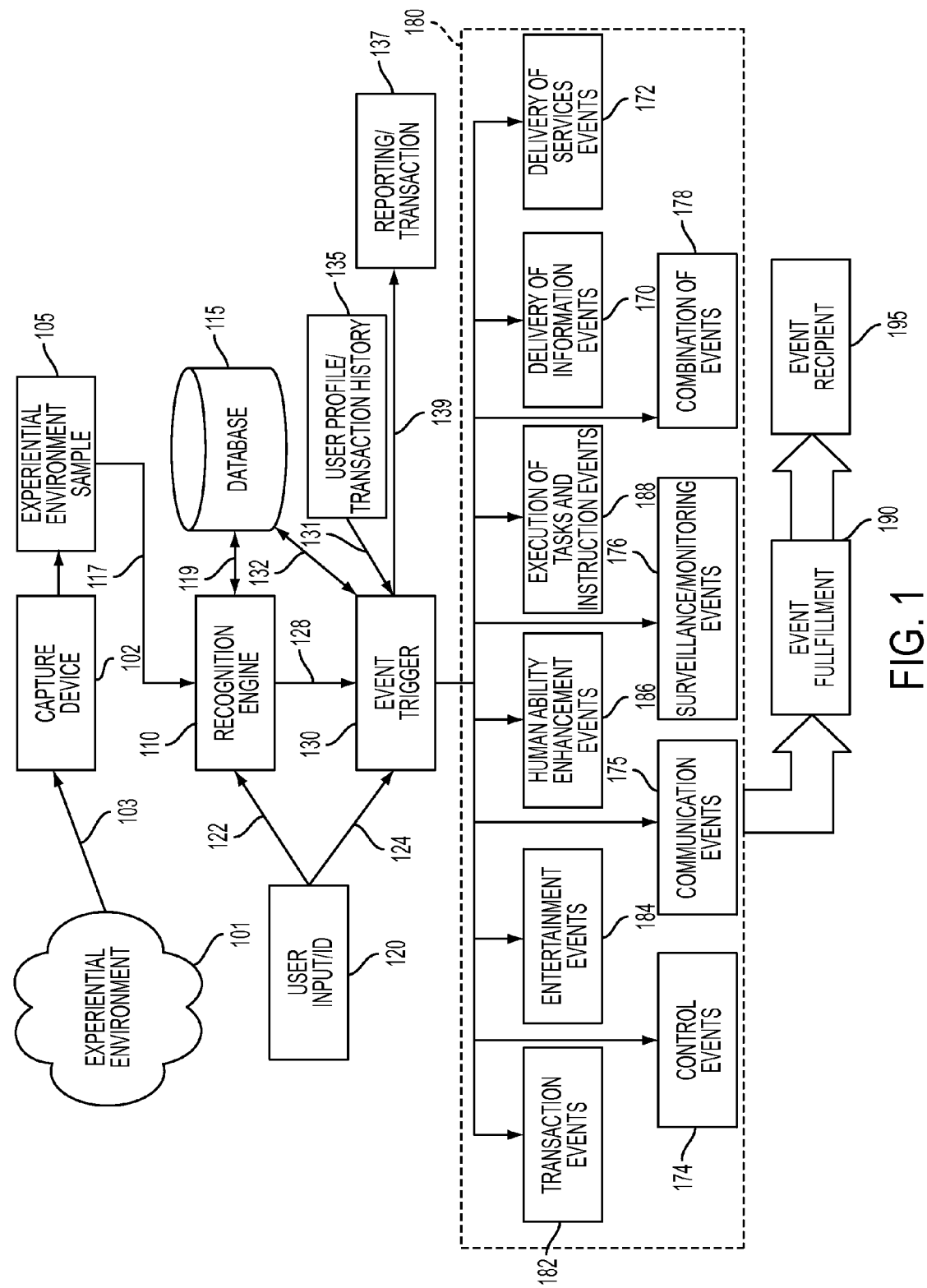
FIG. 1 depicts a block diagram of an arrangement in accordance with the invention including an experiential environment, a recognition engine and related structures, and an event trigger.

At this point, it is worthy to note that any reference herein to "one embodiment" or "an embodiment" means that a particular feature, structure, or characteristic described in connection with the embodiment is included in at least one embodiment of the invention. The appearances of the phrase "in one embodiment" in various places herein are not necessarily all referring to the same embodiment.

The present invention includes a method and system for interacting with a user that includes providing a user with an ability to capture a sample of an experiential environment and delivering that sample to an interactive service to trigger one or more predetermined events. It is noted that the terms "service" and "service provider" and "system" as used herein include a service, service provider, and system, respectively, which employ the various principles of the present invention unless otherwise indicated. Some examples of events that can be triggered include communication events or surveillance events.

The experiential environment can be of any form where a message or information (e.g., content), or other sensory stimuli is available for the user to experience, and may come from many sources. Radio and television, pre-recorded audio and video (e.g. tapes, CDs, DVDs, MP3, etc.) signals on internet and computer-based systems, telephones, live demonstrations or performances, and sensory stimuli from ambient surroundings are several examples of elements which may form, alone or in combination, a typical experiential environment. Using a sampling device, such as an ordinary mobile (or cellular) phone, video recorder, or camera, or a personal digital assistant (PDA) or palm pad, the user captures a sample of the experiential environment and transmits the sample to a service provider employing the present invention.

Alternatively, a personal digital assistant or computer could be specially enabled to act as the interactive service itself by storing the database in its memory and performing the database query and processing without externally accessing the service. In those embodiments wherein the database includes song records, this can easily be incorporated in current capacity disk drives even for millions of songs. Thus, the personal digital assistant would provide complete end-to-end capability for a user and would not require a separate communication channel to the interactive service. In this embodiment, transmission to the service provider would only be needed for additional interaction and potentially for updates of the music database, such as periodically (e.g., weekly).

Another embodiment consists of a hybrid form of above mentioned capturing devices and communication channel. In this embodiment, a Palm handheld device, for example, captures the experimental environment and pre-processes the characteristics of this environment before sending it on to the service provider for recognition. This reduces the bandwidth required for the communication channel and thereby improves the response time, yet does not require the very high speed, high capacity hand held device required by the above embodiments.

The service provider may employ the sample by itself, may derive information from the sample, may use data known about the user (e.g., the user's identity and/or user profile), may accept input from the user, or may employ a combination of all such inputs, to trigger a predetermined event that is responsive to the user's needs.

As described in more detail in the various embodiments of the invention below, and as shown in FIG. 1, such events include the delivery of information and/or services to the user, the execution of tasks and/or instructions by the service on the user's behalf, and other control-oriented events that are responsive to the user's wishes. The triggered events also include transaction-oriented events, entertainment events, and events associated with enhancements to human ability or function. It is noted that combinations of triggered events, as shown in FIG. 1 and described in greater detail below, may also be advantageously used in certain applications of the invention.

A brief overview of one exemplary embodiment of the invention is now provided to briefly highlight the principles of the present invention. In this example (which is described in greater detail below), a method and system is provided for triggering an information delivery event to a user. A user listening to a commercial radio broadcast of popular music at home is interested in singing along with a particular song being broadcast, and thus desires to obtain songs lyrics. Using a conventional telephone, the user dials a predetermined telephone number to access a service utilizing the principles of the present invention, and then holds the telephone handset within audible distance of the source of the audio signal (i.e., the speaker of the user's home stereo), to capture a sample of the environment. In this example, the experiential environment includes the music playing on the user's home stereo.

A system employed by the service provider at the other end of the telephone automatically answers the phone, and using a recognition engine, compares the captured sample to music recordings in a database to identify the song and thereby trigger a desired event for the user. In this example, the triggered event is the delivery of the lyric information to the user that corresponds to the song recognized from the captured sample.

Event fulfillment, the delivery of the desired song lyrics to the user, may be accomplished in number of different ways in both real-time and delayed modes. In real-time mode, lyric data is delivered to so that the user can read the lyrics to sing along with the song, in time, as it is being broadcast. Accordingly, data for the song corresponding to the captured sample is read out of a database and transmitted by the service to a user device such as a computer, TTD device, SMS telephone or device, pager, or other personal communication device capable of displaying text.

Depending on the display device and user preference, the real-time delivery of lyrics may be transmitted in a batch arrangement where relatively large portions or the entire lyric data is downloaded at a time, or using a discrete arrangement where lyric data is automatically synchronized to the song and transmitted in pieces to the user as the song progresses. In the former case, the user may choose to synchronize the display of the lyrics to the song being played (so that the lyrics are displayed at the appropriate time interval in advance of the lyrics being sung or spoken by the song performer on the broadcast), or in some applications of the invention, the user device may be configured to perform synchronization of the batch transmission. In the latter case, the service transmits the lyric data to automatically synchronize to the broadcast song without any action required by the user or user device. Such automatic synchronization is implemented through a derivation of the temporal position of the captured sample within the recognized song.

The delayed mode of event fulfillment includes the delivery of lyrics corresponding to the sampled song sometime after the song broadcast. The same delivery methods as with real-time mode may be used along with delivery methods that are characterized as being more time-consuming such as mail, courier, and facsimile transmission.

In this exemplary embodiment of the invention, additional user input may be collected via voice or touch-tone (i.e., DTMF tones) to further control the lyric delivery event or trigger additional events such as transaction events. For example, by interacting with the user through the capture device or the delivery device, the telephone, and text displaying device respectively, the service may provide purchase options to the user to obtain the record album containing the broadcast and identified song for which the lyrics were sought.

Other purchase options may also be provided to the user by the service provider. In addition to being able to purchase the identified music, the user may purchase other merchandise (which could be related to the music or not). For example, after purchasing the album containing the identified song, the user may choose to purchase tickets to an upcoming performance by the song's artist. Or, the user may inform friends or potential users of the service about the identification and/or album purchase. Such communication could be implemented by the service provider sending an email or SMS message on the user's behalf.

Additional details of the invention will now be described. Referring again to FIG. 1, a block diagram of an exemplary arrangement of the invention is depicted. A sample captured from an experiential environment 101 is represented by block 105. The experiential environment 101 that may be used by the present invention includes virtually any environment where sensory stimuli are present for a user to sense or experience. Typically, elements of such experiential environment 101 include, singularly or in combination, media or other information content (each singularly or in combination referred to as "media" here) delivered in a channelized stream and media delivered in unchannelized streams that are generally sensed via sight or sound. However, it is emphasized that sight and sound are not necessarily the only sensed experiences that may be used in applications of the invention.

Channelized media as used here means media that is delivered to a user through discrete and identifiable means through such conventional sources such as television, radio, prerecorded audio and video (e.g. tapes, CDs, DVDs, MP3, streaming IP video and audio), computers, telephones (both wired and wireless), and messaging devices such as SMS devices and pagers. Thus, while channelized media encompasses both unidirectional broadcasts, and bi-directional communications, it also includes print media such as newspapers, books, and magazines and the visual arts.

Unchannelized media means media that is delivered to a user through means that may be indistinct, less readily identified, or involve multiple sources of media. Examples of unchannelized media include the performing arts, speeches and lectures and the sensory experiences derived from interactions with other persons, or the surrounding environment. Unchannelized media further includes sights, sounds, and other sensory stimuli that result from a user's ambient surroundings.

In accordance with the invention, a user (not shown in FIG. 1) captures a sample of the experiential environment 101 via line 103 using a capture device 102. The capture device 102 captures a sample of experiential environment 105 and provides it in a format suitable for processing by the recognition engine 110 on line 117. Illustrative embodiments of capture devices include, but are not limited to, microphone, telephone, mobile telephone, PDA, tape recorder, digital voice recorder, answering machine, radio receiver, walkie-talkie, internet streaming socket, voice-over-IP transceiver, or other such audio sampling devices. Typically then, the signal capture device is incorporated into a device that the user employs in a location remote from the service. Conventional devices like mobile and regular telephones, PCs, radios, and other recording and communication devices that users already own or use everyday for other purposes may conveniently be used, without modification, to sample both channelized and unchannelized media.

Video or image capture devices may be also be used as capture device 102, in accordance with the invention to provide a sample of experiential environment 105 to recognition engine 110 via line 107, as depicted. For example, camcorders, video conferencing equipment, motion and still video cameras, surveillance devices, cameras, digital cameras, image grabbers, picture telephones and other devices that can capture an image sample of an experiential environment may be conveniently used to provide a sample to recognition engine 110.

User input/identification block 120 may identify the user to the recognition engine 110 as indicated by line 122, and may optionally be operationally coupled to the event trigger block 130 via line 124. Examples of devices that generate the appropriate identification for use with user input/identification block 120 may include caller ID on a POTS (Plain Old Telephone Service) line or a mobile telephone, internet IP address of a terminal sending in the captured signal, or a cookie file stored on an internet browser on the user's terminal.

In another illustrative example of user input/identification block 120, the user may be required to enter an account code, for example by keying it in on a touchtone pad on a telephone or saying a pass phrase while signing on to a service incorporating the principles of the present invention if dialing in. Alternatively, the user may be identified by inserting an object carrying identification codes into a terminal. Examples of this include a credit card, ATM card, or Dallas Semiconductor Java Ring. The user may also be identified by a biometric device to scan fingerprints, retinas, palm print, or other such physical characteristics of the user. A speaker identification system to identify the user by vocal characteristics is another alternative method. User input/identification block 120 is an optional component of the present arrangement, which is employed if billing and tracking of user activity is desired.

Figure 2:
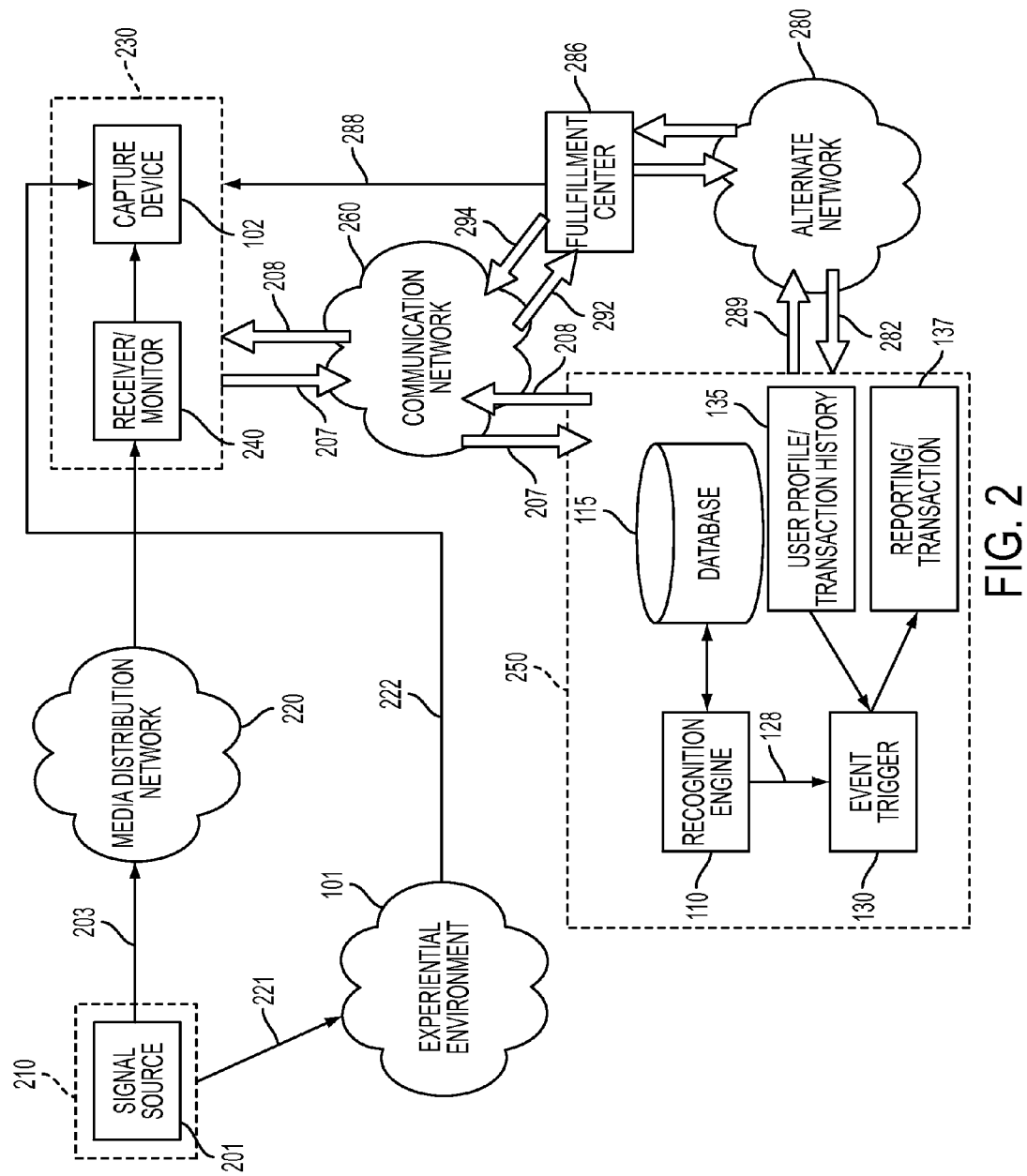
FIG. 2 depicts a block diagram of the relationship of elements of an exemplary embodiment of the invention among a service provider, service user, media provider, and experiential environment, among other elements.

As shown in FIG. 2, the elements shown and described in FIG. 1 are typically associated with entities that are independent of one another. Experiential environment 101 is typically associated with a media operator or content provider such as radio or television broadcasters, CATV provider, internet service providers, entertainment organizations, private network or LAN operators, and the like. However, it is important to emphasize that the present invention contemplates that the experiential environment may comprise a live demonstration or performance, or other unchannelized media, taking place for example, at a nightclub, bar, or discotheque. Moreover, as described above, the experiential environment may include sights, sounds, and other sensory stimuli from the ambient surroundings.

Experiential environment capture device 102 is generally associated with users, however, such association may be merely temporary, as public access devices (e.g., public telephones and internet access facilities) may be readily used, without modification, in order to realize the benefits provided by the present invention. Experiential environment sample 105 represents features and functionalities that, for example, are implemented by the microphone and associated transceiver circuits in a user's mobile telephone or computer. Such features and functionalities could also be implemented by a charge coupled device ("CCD") array that is integrated in a camera associated with a picture telephone or computer. User input/ID block 120 is also associated with the user.

The remaining elements of FIG. 1 are collectively associated as indicated in FIG. 2 with a service provider. Recognition engine 110, reporting and transaction block 137, database 115, and user profile/transaction history 135 represent features and functionalities of an integrated system that form key elements of an interactive service arrangement that may be particularly useful in some applications of the invention. In such interactive service arrangements, these collected elements are typically implemented in a system formed by one or more CPUs. The interactive service arrangement is identified by reference numeral 250 in FIG. 2.

As depicted in FIG. 2, a media provider 210 utilizes signal source 201 which transmits signal 203 via media distribution network 220 which may be arranged from network and transmission elements or other channelized distribution arrangements (as for example, with copper or fiber networks for data or telephony services) or a free space/transmitter infrastructure array (as for example with radio and television broadcasts, satellite systems, and cellular/PCS/GSM wireless telephone services or networks which operate according to short-range wireless protocols such as the Bluetooth™ wireless standard).

Receiver/monitor 240 is employed by user 230 to receive signal 203 and transform the signal into a format that facilitates signal 203 to be monitored by the user. Receiver/monitor 240 may be a radio, television, PC, Hi-fi (i.e., stereo) with speakers or any other device that may be used to create a media experience (including audio and video) that may be monitored by the user. User 230 using, for example, a mobile telephone, obtains a sample of signal 203 played on receiver/monitor 240, where the sample includes media content of interest selected by the user, such as a portion of an image or sound.

Thus, as shown in FIG. 2, receiver/monitor 240 both outputs a rendition of signal 203 to 105 and allows the user 230 to monitor signal 203. However, it is noted that signal capture device 102 may capture a sample of signal 203 via a direct connection to media distribution network 220 (i.e., not relying on receiver/monitor 240 or similar device for signal input). In such instances, the user monitoring of signal 203 is accomplished through other means or user monitoring is not performed.

In the case of unchannelized media, capture device captures a sample directly from experiential environment 101 via line 222 without relying on a media distribution network 220. In such cases, a signal source transmits directly into the environment, as indicated by line 221, or the experiential environment is itself being captured by capture device 102. For example, as described above, the arrangement of the present invention may be advantageously used to trigger a variety of predetermined events from a sample of live performances, interaction, or the sights and sounds of the ambient surroundings.

The captured sample of signal 203 is relayed by the user 230 to the interactive service arrangement 250, as shown, via communication network 260 on line 207, as shown. Communication network 260 may have a similar arrangement as distribution network 220, or may be unitary with distribution network 220. It should be noted, however, that in certain applications of the invention distribution network 220 may typically be characterized by unidirectional signal propagation (as in the case with broadcast radio and television or typical CATV head end systems) while communication network 260 may typically be characterized by bi-directional signal propagation (as in the case with the public switched telephone network and wireless or wired voice, data, and internet systems). Such bidirectional nature of communication network 260 is indicated by signal flow lines 207 and 208 as depicted in FIG. 2.

In accordance with the invention, the interactive service arrangement 250 derives information or characteristics of sample of signal 203. Such derived information may be returned to the user 230 from the interactive service arrangement 250 using the same communication network 260 or other networks. The signal return path is indicated with lines 208 in FIG. 2. And, as described above, the interactive service arrangement 250 may interact with the user and other entities. For illustrative purposes, such interaction pathways are depicted in FIG. 2 as lines 289 and 282, input and output, respectively, via alternate network 280. Alternate network 280 may be a network of any type, however, in some applications of the invention it may be advantageous to employ private networks, dedicated lines, or other high-capacity transmission methods should high-bandwidth interactions be desired. Such bandwidth intensive interactions could occur, for example, between the interactive service arrangement 250 and fulfillment partners such as record distributors or merchandise retailers. This communication path is shown in FIG. 2 where fulfillment center 286 interacts with interactive service arrangement 250 using alternate network 280 and fulfills user requests as indicated by line 288. Fulfillment center 286 may also interact with interactive service arrangement 250 using communication network 260 over interaction pathways 292 and 294 as indicated.

Thus, FIG. 2 may serve to additionally highlight the principles applied in the exemplary embodiment of the invention that was briefly overviewed at the beginning of the Detailed Description. A radio station (media provider 210) employing signal source 201 broadcasts a song (signal 203) over the air (media distribution network 220), which is received on a radio (receiver/monitor 240) of user 230. User 230 wishes to sing along with the song. User 230 places a mobile telephone call over a wireless network (communication network 260) to interactive service arrangement 250. User 230 positions the microphone of his wireless telephone (capture device 102) to capture a sample of the music being played on the radio. The interactive service arrangement 250 receives the sample over the wireless network and derives the identity of the song.

Optionally, the identity of the user may be derived from the user's mobile telephone number that is sent from the communication network 260 to the interactive service arrangement 250 typically during call set up. The song lyrics are returned to back to the user's mobile telephone over the same network. Further interactions between the user 230 and the interactive service arrangement 250 may occur, and if the user chooses to purchase related merchandise (such as a CD recording of the album containing the broadcast song, or hardcopy printout of the desired lyrics), the interactive service arrangement 250 can send the purchase information to the service's distribution facility (fulfillment center 286) via data or voice communication using its local area PC network (alternate network 280) or via data or voice communication over communication network 260 as discussed above.

The distribution center sends the merchandise to the user via overnight courier service (line 288). Similarly, alternate network 280 may be utilized to send an email or facsimile containing the song lyrics to the user's email account.

In some embodiments of the invention, the service relies upon a profile for the user that is created in advance of the call (but may be updated during a call as described below). A "user profile" may typically include general information about the user such as name, address, preferred method of payment (i.e., credit card pre-authorization), and set dollar limits on purchases. In addition, service-specific information regarding the user may also be included in the profile, such as demographic and user-identified preference information, to facilitate the service tailoring the transaction to fit a particular user. Moreover, with automatic telephone number identification, i.e., "caller ID", profiles can be built without prior user registration.

Age, education, residence, gender, occupation, and personal interests, likes and dislikes, among other criteria, may be employed to most effectively match transaction offers to users' interests and purchase habits. For example, one particular customer of the service may have a user profile that indicates that the user is a member of a demographic group that is music-savvy and aware of music trends. After offering to sell a recording of the song selected by the user, the service could offer to sell a recording by an artist that is "moving up the charts" in popularity. Thus, by employing a user profile in some applications of the invention, a higher transaction closing rate may be realized as offers are more accurately targeted to users who may be predisposed to view the offer favorably.

It is noted that user profiles are often dynamic and that the present invention includes an ability to update and change a user profile in response to changes in usage patterns (as described below), market and industry trends, user input, and other factors.

A feature of the invention related to user profile is usage tracking. By tracking the frequency and time of access, and purchase history, for example, of a user, the service can gain additional insight into factors which may influence a user. Patterns of usage may be derived which may allow predictive modeling to be utilized, for example, to enhance and refine service offerings. The system of the present invention can thus differentiate between repeat users (who heavily access the service) and casual users (who occasionally or infrequently use the service) and adjust the options, offers, and interactive scripting (as described below) so that interest and enthusiasm is maintained among the service's customers. It is contemplated that the user profile and usage tracking/pattern features described here may be used in other embodiments and applications of the inventions as well.

User profile and usage tracking are examples of a priori information (i.e., information known by the service provider in advance of a specific interaction with a user) and external information (i.e., information known by the service provider that is determined other than by analyzing the captured sample itself). It will be recognized that other sources of a priori and/or external information may also be advantageously used in some applications of the invention. For example, the location of the user, caller ID signal, dialed number indication service ("DNIS") and the capture device employed by the user may, alone or in combination, be used by the service provider to select or otherwise tailor the triggered events to meet user expectations or needs.

Referring again to FIG. 1, the experiential environment sample is received by recognition engine 110 on line 117. Recognition engine 110 derives characteristics of the received sample by using data stored in database 115. Recognition 110 and database 115 are operationally coupled via line 119, as shown in FIG. 1. A variety of derivation methods may be used. In the case of audio samples, the techniques described in Appendix may be used. However, it is noted that the derivation methods that may be used in this invention are not limited to such techniques. The particular derivation method chosen is only required to be able to derive sufficient characteristics from the experiential environment sample to enable a predetermined event to be triggered. Thus, the strength or resolution of the derivation is coupled, in large measure, to the level of discrimination required in selecting an event to be triggered. As the number of potentially triggered events increases, the necessity to resolve ambiguity in the sample also increases.

For example, in the case of the exemplary embodiment where song lyrics corresponding to a broadcast song are sought by a user, a relatively large number of characteristics about the sample may be derived and compared against stored data to be able to identify the particular song from the many such songs that may be stored. That is, as more songs are potentially identified, more lyric delivery events are potentially triggered. By comparison, in service offerings where there are a relatively small number of events that may be potentially triggered, fewer sample characteristics need typically be derived in order to resolve ambiguity as to which event to trigger. Such service offering may include those where a binary "Yes" or "No" event may be triggered as may be the case for customer surveys and voting/polling type services.

The derived sample characteristics are provided to event trigger 130 on line 128, as indicated in FIG. 1. Event trigger 130 may trigger one or more predetermined events according to the derived sample characteristics. The triggering criteria used by event trigger 130 may be provided by the characteristics themselves or be externally provided by database 115. Alternatively, in the case of binary type events, the mere receipt of any input signal at the event trigger may be sufficient to trigger a particular event. As used here, triggering criteria means those factors, data, or inputs, which are used by the event trigger 130 to select the particular one (or group) of actions to take among the many that may be available.

While triggering criteria are provided by recognition engine 110 as a result of the derivation of characteristics from the captured experiential environment sample, additional triggering criteria may also be used in combination with the derived characteristics. As depicted in FIG. 1, such additional triggering criteria may come from the user on line 124 as user input in the form of voice, audio or visual commands. For example, a user may provide input to the event trigger by using the touch tone keypads on a telephone, providing keyboard input on a computer, or providing captioning information over a video feed using a video camera. In addition, user profile and transaction history information, as described above, may be used as additional triggering criteria. As shown in FIG. 1, user profile/transaction history block 135 is operably coupled to event trigger 130 via line 131 to provide such additional triggering criteria. However, in some applications of the invention, user profile/transaction history block 135 may provide user and/or transaction data to recognition engine 110 (not shown in FIG. 1) that may be used to assist in the characteristic derivation process. For example in a music identification embodiment of the invention, recognition engine 110 may, in certain applications, rely on the particular user's usage history which indicates a strong preference for a specific music genre. This usage history may help eliminate some potential identification candidates that may have some sonic correlations to stored data in database 115, but are very dissimilar to the types of songs sought to be identified by the user in the past and stored in user profile/transaction history 135.

Reporting/transaction block 137 is operably coupled to the event trigger 130 via line 139 as shown so that event usage may be tracked by the service provider for purposes of creating reports or billing transactions to the user.

As shown in FIG. 1, event trigger 130 can trigger a variety of events indicated collectively by reference numeral 180. It is noted that the depicted events are merely illustrative and are shown to highlight various categories or types of events that may be triggered using the principles of the invention.

Transaction events 182 are one category of events that may be triggered in accordance with the invention. These typically include the purchase and sale of merchandise. In an exemplary embodiment of the invention, a user reading the newspaper may see an advertisement for a raincoat that stimulates a buying interest in the user. Using a video camera on the user's PC, the user holds the print advertisement near the camera to capture a still image of the advertisement. By using a predetermined web address of the World Wide Web, the user reaches a service provider and uploads to the image to the service provider's recognition engine. The advertisement could be included in a billboard, in which case the user could use a still camera or video camera to capture it.

The recognition engine, using conventional text recognition algorithms, pulls the name of the advertiser and advertising copy for the raincoat from the still image. Employing an interactive script on the web-page, the user is prompted for size and color preferences. The user's credit card and shipping information may already be on file with the service provider using user profile/transaction history 135, or such information may be collected from the user on-line through the web-interface or using off-line communications such as telephone, email, or facsimile.

The derived characteristics, namely the advertiser's name and clothing information, is combined with information about the advertiser stored on database 115 and used by event trigger 130 to trigger a purchase by the user of the desired raincoat. The transaction particulars are forwarded to an event fulfillment center, depicted in FIG. 1 by reference numeral 190, for actual physical fulfillment of the raincoat to the event recipient 195, in this case, the user. In this exemplary embodiment of the invention, the service provider may merely function as a deal broker between the advertiser and user where the order information is provided to the advertiser and the service provider collects a service fee from the advertiser. Alternatively, the service provider may derive revenue from charging the user a subscription fee to use the service, which facilitates the transaction as described above. In some applications of the invention, a combination of these revenue models may be advantageously used.

Entertainment events 184 may also be triggered in accordance with the invention. In addition to the exemplary embodiment involving the delivery of lyrics, as described above, a wide variety of entertainment-type services be advantageously provided by the practice of the invention. Entertainment is defined here to include services where interaction with the service directly provides the value to the user. This compares with some typical transaction events where the service provider furnishes a tangential broker or facilitation service, which is attendant to the purchase and sale transaction between the user and a third party.

An illustrative example of an entertainment event 184 provided by the present invention includes game-type events. A user listening to music captures a sample of a song on a mobile telephone, which has been dialed in to a service provider. The recognition engine 110 compares the sample to known songs in database 115 and derives the identity of the song. A game type entertainment event is then triggered by the service to automatically send a small excerpt of the originally recorded song (i.e., not the captured sample of the song) to a pre-determined group of the user's friends via. For example, a WAV file or MP3 attachment to an email message sent by the service provider or through a call placed by the service to the friend's wired or wireless telephone. The identification data for members of the group may be stored in a user profile, for example.

The friends are prompted in the message or call to try to "Name that Tune" by identifying the song's title or artist from the small excerpt. The friend's guesses may be collected by the service provider using a variety of methods, including for example, an interactive website, telephone call center, email, or conventional mail. If no one correctly identifies the song, the song excerpt may be increased in length, or a different excerpt may be furnished, in an iterative manner, until a "winner" is determined.

Human ability enhancement events 186 are also depicted in FIG. 1. These events are similarly triggered by captured samples of an experiential environment. In embodiments of inventions using these events, enhancements to ability and function are realized by the ability of capture devices 102 to sense the environment in manners that transcend human ability or in manners that replace ordinary senses that are undeveloped or lost through illness or accident in particular individuals.

For example, in the case of sensory enhancement, capture devices such as telephones may quite easily arranged to be more sensitive to sound or to particular frequencies of sound than the human ear through the use of amplifiers and filters. Similarly, visual capture devices may be arranged to provide magnification of far away scenes or make small scenes appear large. Thus, an ability to extend one's senses through the use of technology, in accordance with the invention, provides great opportunity to trigger desired events that could otherwise not occur with unaided senses. In an exemplary embodiment of this aspect of the invention, a bird watching user may wish to keep a catalog of sightings in the neighborhood. Using a digital camera with a zoom lens, the user takes a digital picture of a distant bird and the captured image is later uploaded to a predetermined service provider's computer. The recognition engine 110 could be configured to recognize the bird based on characteristics such as colors and patterns, however, in other applications, recognition engine 110 may more simply be configured to derive a smaller constellation of key characteristics. For example, the recognition engine may derive that the captured experiential environment sample represented is a color digital photograph and trigger an image archiving event for the user. Or, dominant colors may be derived to allow an image sorting event to be triggered. In both of these events, the service provider uses the derived characteristics of the captured sample (the digital photographs) to automatically archive and arrange the photos in a manner that is consistent with a service offering in which the user participates.

Another exemplary embodiment of sensory enhancement is the ability for a user to implement a virtual sense in a remote location. For example, a mother may dial a predetermined number to access a service provider using a conventional telephone located in a sleeping child's room. The telephone is left off hook to constantly sample the ambient conditions in the room. The sampled environment is processed to determine whether the child has awoken by listening for the frequency and amplitude characteristics associated with crying or yelling and places a call or page to the mother to let her know of the change in circumstances. In such cases, the database 115 and event trigger 130 are arranged to trigger the call or page based on the sound characteristics of crying, but other events could be triggered, such as a call to fire department, using other sound characteristics such as the timbre of a smoke or carbon monoxide detector.

In the case of sensory replacement, capture devices replace senses lost or undeveloped in an individual user, or augment existing senses to make up for a lost sense. In these cases, capture devices may be arranged to capture a sample of an experiential environment to trigger events that can provide assistance that marc typical sensory aides cannot. For example, a visually impaired user may configure video equipment to monitor the entrance to the home. A service receiving the video feed may sample the scene at the remote end to determine when sufficient changes have occurred in the captured scene to determine that a person is at the door. If desired, the user may provide data to the service to allow particular individuals to be recognized and announced to the user through a telephone call, page, SMS message, email, and the like.

Block 188 indicates that the execution of task and instruction events are provided by the invention. In embodiment of the invention using this feature, a variety of predetermined events are triggered by the receipt of a particular sample that involve a service performing actions on behalf of the user. Tasks such as bill or invoice payment may be readily automated by uploading a scanned image of the bill to a service provider. The service provider, upon receipt of the captured image, and optionally in combination with user profile data, can derive the identity of the payee and automatically pay the bill on behalf of the user and debit the user's bank account or credit card.

Block 170 in FIG. 1 depicts that events for the delivery of information can be triggered in response to the receipt of particular captured samples. In embodiments of the invention utilizing this feature, a service provider triggers the delivery of information to the user or third parties. For example, a service provider may receive a set of sound samples from a user's microphone attached to a computer that is monitoring financial news broadcasts. Deriving the names of companies from the sampled news that the user has indicated an interest in monitoring, the service automatically downloads stock quotes and related news information to the user's computer.

In a similar manner as with the delivery of information, delivery of services events, as shown in block 172 may also be triggered in accordance with the invention. Continuing with the financial example above, a service provider may provide financial documentation services to the user such as the automated provision of public securities and investment analysis documents based on the companies of interest that are discussed in the monitored news broadcast. In such embodiments of the invention, the user may provide other event triggering criteria such as the minimum number of utterances of a particular company name in a particular time period before the automated provision of documents is triggered.

Block 174 in FIG. 1 shows that control events may also be triggered in response to a sampled experiential environment in accordance with the invention. Control events are those that provide the user with an ability to control or otherwise manipulate information and data, services, or other events in a predetermined manner according to the captured sample received by a service provider. For example, a human resources recruiter may organize a data archive of job candidates and associated demographic data by engaging a service provider that automatically manipulates the data according to web-site images of potential hiring companies that are captured in a frame grabber running on the user's computer and uploaded to the service provider. In such cases, the candidate database can be sorted according to the captured web-document and derived by deriving preselected characteristics such as industry type, key-words in the text elements of the page, and other characteristics.

Communication events may be triggered in accordance with the invention as depicted by block 175 in FIG. 1. Communication events include, for example, communicative interactions among users, between users and the service provider, or such interactions between users, the service provider, and third parties.

An exemplary embodiment of the invention involving a triggered communication event follows. In this embodiment, a user listening to music dials into a service and captures a sample of a song on his mobile telephone. The recognition engine 110 compares the sample to known songs in database 115 and derives the identity of the song. In accordance with the invention, the service then triggers a communication event to notify a second user that the first user engaged the service to identify the song. The notification may be implemented, for example, by the service sending an email or SMS message to the second user. An excerpt of the original recording of the identified song may optionally be attached in the message for the second user to hear. This embodiment of the invention may be of particular relevance to persons interested in music trends who want to communicate, share, or kept be abreast of the latest developments in music.

The particular user or group of users chosen to be notified by the user may be selected in advance, for example, by employing a user profile that stores the email address or SMS number of the users to be notified. Or, the user may interact with the service via a conventional interactive voice response unit to indicate a choice relatively contemporaneously with the sample capture process.

In some applications of the invention, the dial-in number to the service may be used to indicate a choice by the user. For example, the user may program his mobile phone (or the phone may be preprogrammed by the service provider or partner) so that a plurality of numbers are stored, each indicating a particular user selection to the service. If, for example, the mobile phone stores three dial-in numbers, say *211, *212, and *213, each number may be used to reach the service while indicating a particular user choice. While all the numbers dial into the same service provider, the fact that a particular dialed number was employed by the user is given to the service provider by communication networks 260 (FIG. 2) via a dialed number identification service ("DNIS"). In the music trend embodiment described above, *211 could be used to indicate a user desire to trigger a particular communication event, according to a pre-programmed user profile, for example, to notify user A that a song identification was sought by the user. Similarly, *212 could indicate communications with users A and B, and *213 could indicate the user desire to notify and provide a song excerpt to a predefined third party.

In other applications of the invention, the DNIS may be advantageously utilized to allow user selection of a triggerable event from a plurality of events that may be hosted by a service provider. If, for example, a single service provider hosts both shopping services (a transaction event) and game services (an entertainment event), then the DNIS may be used by the service provider (perhaps among other factors used) to disambiguate among the offered events and trigger the particular event desired by the user in response to a triggering characteristic derived from the experiential environment sample received from the user.

An embodiment of the invention similar to that above also involves communication events. In this embodiment, the user captures a sample of a song to trigger a communication event, which is embodied in the form of a musical greeting card. Such musical greeting cards include an excerpt of the original recording of the identified song with a text or voice annotation from the user that may be personalized to a specific occasion or event. Thus, as the two communication event embodiments described above demonstrate, the principles of the present invention may be advantageously utilized to trigger user-to-user (also referred to as "peer-to-peer") services in response to a received sample of a captured experiential environment.

Surveillance and/or monitoring events are also contemplated by the present invention, as depicted by block 176 in FIG. 1. In such events, a sample or series of samples of an experiential environment is captured by the user and relayed to the service provider in order to trigger events that may facilitate the detection of the presence or absence of one or more characteristics, elements, or features in the environment, or a change in such environment.

In a first embodiment of the invention involving a triggerable surveillance or monitoring event, a chemical detection device or "sniffer" is employed by a user to sample the air in the environment. Such sniffers are known and may employ various sensory techniques, such as gas chromatography, to determine the presence and concentration of chemical elements or compounds in the air sample. A signal indicative of the elemental constituents of the sample is forwarded to the service provider whereby analysis of the signal is performed to derive characteristics of the sample used to trigger a desired event. For example, an agricultural user may desire to monitor the conditions of crops. By monitoring the emission of certain gases associated with the decomposition of fertilizer and organic matter, and other gases produced by the growing crops, the user may optimize the application of water, fertilizers and pesticides to produce the highest yield. The service provider can trigger an alert to the user, via facsimile, email, mail, phone call, SMS message, or a variety of other communication methods, when a particular threshold condition has been met or exceeded.

Advantageously, the present invention separates the experiential environment sensing apparatus (i.e., the sniffer) from the analysis and event triggering apparatus (i.e., the recognition engine 110 and event trigger 130 in FIG. 1). The sensing apparatus is associated with the user who can best control its deployment in the experiential environment, while the analysis and event triggering apparatus is detached from the user. Such detachment allows the service provider the opportunity to host a wide variety of surveillance and monitoring events that would be impractical to implement in a portable local device. For example, in accordance with the invention, a single sniffer may be used to monitor both crop condition, as described above, as well as methane levels in effluents from a milk parlor of a dairy farm. The required analysis of the gas samples, and the determination of whether a alarm condition exists would be based on criteria that vary widely between these two applications, yet the service provider could readily trigger the different monitoring events due to flexibility associated with remote analysis/trigger arrangement.

A variation of this first embodiment includes an arrangement where a scaled down sniffer is carried by a user. While such a device would be limited in the range of elements it could detect, the flexibility of the remote analysis and triggering arrangement of the present invention still may provide many advantages. That is, a less sensitive sensing device, in accordance with the invention, may be coupled with a remotely located, flexible and powerful analysis tool to trigger useful and desirable events. For example, a user with a sensitivity to a particular environment condition, such as an allergy to a specific food, may carry a small device that has sensitivity to the chemical signature of that food. The device samples the environment periodically and sends a representative signal via a wireless transceiver to the service provider for analysis. Upon derivation of characteristics indicating an alert event, the service provider can communicate back to the user, via the same sensing device or using alternative communication pathways such as telephone, pager or fax. Optionally, the alert signal may be sent by the service provider to third parties including, for example, the user's doctor, emergency contact or others as conditions warrant.

In a second embodiment of the invention involving a triggerable surveillance or monitoring event, a spectrum analyzer is configured to sample the strength of constituent wavelengths of light in an experiential environment. A particular spectral sample of the environment can be compared by the service provider against stored signatures to trigger a variety of surveillance or monitoring events. For example, the level of ultraviolet radiation in a warehouse may be compared against stored data to trigger remote control of vents, skylights, or other HVAC devices in the building by the service provider.

Block 178 in FIG. 1 indicates that various combinations of the events shown and described in blocks 182-188, and 170-176 are also contemplated as being advantageously used in some applications of the invention. That is, some applications may benefit by triggering multiple events, in sequence or in parallel, that may be of the same or differing types.

Other embodiments of the invention may be implemented in accordance with the claims that follow.

Appendix 1

Abstract

We disclose a method and apparatus for recognizing sound, music, and other similar signals. The disclosed invention is capable of recognizing an exogenous sound signal that is a rendition of a known recording indexed in a database. The exogenous sound signal may be subjected to distortion and interference, including background noise, talking voices, compression artifacts, band-limited filtering, transmission dropouts, time warping, and other linear and nonlinear corruptions of the original signal. The algorithm is capable of identifying the corresponding original recording from a large database of recordings in time proportional to the logarithm of the number of entries in the database. Given sufficient computational power the system can perform the identification in nearly real-time, i.e. as the sound is being sampled, with a small lag.

Database Construction

The sound database may consist of any collection of recordings, such as speech, music, advertisements, or sonar signatures.

Indexing

In order to index the sound database, each recording in the library is subjected to landmarking and fingerprinting analysis to generate an index set for each item. Each recording in the database has a unique index, sound-ID.

Landmarking

Each sound recording is landmarked using methods to find distinctive and reproducible locations within the sound recording. The ideal landmarking algorithm will be able to mark the same points within a sound recording despite the presence of noise and other linear and nonlinear distortion. The landmarking method is conceptually independent of the fingerprinting process, but may be chosen to optimize performance of the latter. Landmarking results in a list of timepoints $\{landmark_k\}$ within the sound recording at which fingerprints should be calculated. A good landmarking scheme marks about 5-10 landmarks per second of sound recording, of course depending on the amount of activity within the sound recording.

Power Norms

A simple landmarking technique is to calculate the instantaneous power at every timepoint and to select local maxima. One way of doing this is to calculate the envelope by rectifying and filtering the waveform directly. Another way is to calculate the Hilbert transform (quadrature) of the signal and use the sum of the magnitudes squared of the Hilbert transform and the original signal.

Spectral Lp Norms

The power norm method of landmarking is especially good for finding transients in the sound signal. The power norm is actually a special case of the more general Spectral Lp Norm, where p=2. The general Spectral Lp Norm is calculated at each time along the sound signal by calculating the spectrum, for example via a Harming-windowed Fast Fourier Transform (FFT). The Lp norm for that time slice is then calculated as the sum of the p-th power of the absolute values of the spectral components, optionally followed by taking the p-th root. As before, the landmarks are chosen as the local maxima of the resulting values over time.

Multislice Landmarks

Multi-slice landmarks may be calculated by taking the sum of p-th powers of absolute values of spectral components over multiple timeslices instead of a single slice.

Finding the local maxima of this extended sum allows optimization of placement of the multislice fingerprints, described below.

Fingerprinting

The algorithm computes a fingerprint at each landmark timepoint in the recording. The fingerprint is generally a value or set of values that summarize a set of features in the recording near the timepoint. In our implementation the fingerprint is a single numerical value that is a hashed function of multiple features.

The following are a few possible fingerprint categories.

Salient Spectral Fingerprints

In the neighborhood of each landmark timepoint a frequency analysis is performed to extract the top several spectral peaks. A simple such fingerprint value is just the single frequency value of the strongest spectral peak. The use of such a simple peak resulted in surprisingly good recognition in the presence of noise, but resulted in many false positive matches due to the non-uniqueness of such a simple scheme. Using fingerprints consisting of the two or three strongest spectral peaks resulted in fewer false positives, but in some cases created a susceptibility to noise if the second-strongest spectral peak was not sufficiently strong enough to distinguish it from its competitors in the presence of noise—the calculated fingerprint value would not be sufficiently stable. Despite this, the performance of this case was also good.

Multislice Fingerprints

In order to take advantage of the time-evolution of many sounds a set of timeslices is determined by adding a set of offsets to a landmark timepoint. At each resulting timeslice a Salient Spectral Fingerprint is calculated. The resulting set of fingerprint information is then combined to form one multitone fingerprint. Each such fingerprint is much more unique than the single-time salient spectral fingerprint since it tracks temporal evolution, resulting in fewer false matches. Our experiments indicate that using two or three timeslices along with the single strongest spectral peak in each timeslice results in very good performance, even in the presence of significant noise.

LPC Coefficients

In addition to finding the strongest spectral components, there are other spectral features that can be extracted and used as fingerprints. LPC analysis extracts the linearly predictable features of a signal, such as spectral peaks, as well as spectral shape. LPC coefficients of waveform slices anchored at landmark positions can be used as fingerprints by hashing the quantized LPC coefficients into an index value. LPC is well-known in the art of digital signal processing.

Cepstral Coefficients

Cepstral coefficients are useful as a measure of periodicity and may be used to characterize signals that are harmonic, such as voices or many musical instruments. A number of cepstral coefficients may hashed together into an index and used as a fingerprint. Cepstral analysis is well-known in the art of digital signal processing.

Index Set

The resulting index set for a given sound recording is a list of pairs (fingerprint, landmark) of analyzed values. Since the index set is composed simply of pairs of values, it is possible to use multiple landmarking and fingerprinting schemes simultaneously. For example, one landmarking/fingerprinting scheme may be good at detecting unique tonal patterns, but poor at identifying percussion, whereas a different algorithm may have the opposite attributes. Use of multiple landmarking/fingerprinting strategies results in a more robust and richer range of recognition performance. Different fingerprinting techniques may be used together by reserving certain ranges of fingerprint values for certain kinds of fingerprints. For example, in a 32-bit fingerprint value, the first 3 bits may be used to specify which of 8 fingerprinting schemes the following 29 bits are encoding.

Searchable Database

Once the index sets have been processed for each sound recording in the database, a searchable database is constructed in such a way as to allow fast (log-time) searching. This is accomplished by constructing a list of triplets (fingerprint, landmark, sound ID), obtained by appending the corresponding sound_ID to each doublet from each index set. All such triplets for all sound recordings are collected into a large index list. In order to optimize the search process, the list of triplets is then sorted according to the fingerprint. Fast sorting algorithms are well-known in the art and extensively discussed in D. E. Knuth, "The Art of Computer Programming, Volume 3: Sorting and Searching," hereby incorporated by reference. High-performance sorting algorithms can sort the list in N log(N) time, where N is the number of entries in the list. Once this list is sorted it is further processed by segmenting it such that each unique fingerprint in the list is collected into a new master index list. Each entry in this master index list contains a fingerprint value and a pointer to a list of (landmark, sound ID) pairs. Rearranging the index list in this way is optional, but saves memory since each fingerprint value only appears once. It also speeds up the database search since the effective number of entries in the list is greatly reduced to a list of unique values.

Alternatively, the master index list could also be constructed by inserting each triplet into a B-tree with non-unique fingerprints hanging off a linked list. Other possibilities exist for constructing the master index list. The master index list is preferably held in system memory, such as DRAM, for fast access.

Recognition System

Once the master index list has been built it is possible to perform sound recognition over the database.

Sound Source

Exogenous sound is provided from any number of analog or digital sources, such as a stereo system, television, Compact Disc player, radio broadcast, telephone, mobile phone, internet stream, or computer file. The sounds may be real-time or offline. They may be from any kind of environment, such as a disco, pub, submarine, answering machine, sound file, stereo, radio broadcast, or tape recorder. Noise may be present in the sound signal, for example in the form of background noise, talking voices, etc.

Input to the Recognition System

The sound stream is then captured into the recognition system either in real-time or presented offline, as with a sound file. Real-time sounds may be sampled digitally and sent to the system by a sampling device such as a microphone, or be stored in a storage device such as an answering machine, computer file, tape recorder, telephone, mobile phone, radio, etc. The sound signal may be subjected to further degradation due to limitations of the channel or sound capture device. Sounds may also be sent to the recognition system via an internet stream, FTP, or as a file attachment to email.

Preprocessing

Once the sound signal has been converted into digital form it is processed for recognition. As with the construction of the master index list, landmarks and fingerprints are calculated. In fact, it is advisable to use the very same code that was used for processing the sound recording library to do the landmarking and fingerprinting of the exogenous sound input. The resulting index set for exogenous sound sample is also a list of pairs (fingerprint, landmark) of analyzed values.

Searching

Searching is carried out as follows: each fingerprint/landmark pair (fingerprint$_k$, landmark$_k$) in the resulting input sound's index set is processed by searching for fingerprint$_k$ in the master index list. Fast searching algorithms on an ordered list are well-known in the art and extensively discussed in Knuth, Volume 3 (ibid), incorporated by reference. If fingerprint$_k$ is found then the corresponding list of matching (landmark*$_j$, sound_ID,) pairs having the same fingerprint is copied and augmented with landmark$_k$ to form a set of triplets of the form(landmark$_k$, landmark*$_j$, sound_ID,). This process is repeated for all k ranging over the input sound's index set, with the all the resulting triplets being collected into a large candidate list.

After the candidate list is compiled it is further processed by segmenting according to sound_ID. A convenient way of doing this is to sort the candidate list according to sound_ID, or by insertion into a B-tree. The result of this is a list of candidate sound_IDs, each of which having a scatter list of pairs of landmark timepoints, (landmark$_k$, landmark*$_j$) with the sound_ID stripped off.

Scanning

The scatter list for each sound_ID is analyzed to determine whether it is a likely match.

Thresholding

One way to eliminate a large number of candidates is to toss out those having a small scatter list. Clearly, those having only 1 entry in their scatter lists cannot be matched.

Alignment

A key insight into the matching process is that the time evolution in matching sounds must follow a linear correspondence, assuming that the timebases on both sides are steady. This is almost always true unless the sound on one side has been nonlinearly warped intentionally or subject to defective playback equipment such as a tape deck with a warbling speed problem. Thus, the matching fingerprints yielding correct landmark pairs (landmark$_n$, landmark*$_n$) in the scatter list of a given sound_ID must have a linear correspondence of the form $$\text{landmark*}_n = m * \text{landmark}_n + \text{offset}$$

where m is the slope, and should be near 1, landmark$_n$ is the corresponding timepoint within the exogenous sound signal, landmark*$_n$ is the corresponding timepoint within the library sound recording indexed by sound_ID, and offset is the time offset into the library sound recording corresponding to the beginning of the exogenous sound signal.

This relationship ties together the true landmark/fingerprint correspondences between the exogenous sound signal and the correct library sound recording with high probability, and excludes outlier landmark pairs. Thus, the problem of determining whether there is a match is reduced to finding a diagonal line with slope near 1 within the scatterplot of the points in the scatter list.

There are many ways of finding the diagonal line. A preferred method starts by subtracting m*landmark$_n$ from both sides of the above equation.

$$(\text{landmark*}_n - m*\text{landmark}_n) = \text{offset}$$

Assuming that m is approximately 1, we arrive at $$(\text{landmark*}_n - \text{landmark}_n) = \text{offset}$$

The diagonal-finding problem is then reduced to finding multiple landmark pairs that cluster near the same offset value. This is accomplished easily by calculating a histogram of the resulting offset values and searching for the offset bin with the highest number of points. Since the offset must be positive if the exogenous sound signal is fully contained within the correct library sound recording, landmark pairs that result in a negative offset are excluded.

The winning offset bin of the histogram is noted for each qualifying sound_ID, and the corresponding score is the number of points in the winning bin. The sound recording in the candidate list with the highest score is chosen as the winner. The winning sound_ID is provided to an output means to signal the success of the identification.

To prevent false identification, a minimum threshold score may be used to gate the success of the identification process. If no library sound recording meets the minimum threshold then there is no identification.

Pipelined Recognition

In a real-time system the sound is provided to the recognition system incrementally over time. In this case it is possible to process the data in chunks and to update the index set incrementally. Each update period the newly augmented index set is used as above to retrieve candidate library sound recordings using the searching and scanning steps above. The advantage of this approach is that if sufficient data has been collected to identify the sound recording unambiguously then the data acquisition may be terminated and the result may be announced.

Reporting the Result

Once the correct sound has been identified, the result is reported. Among the result-reporting means, this may be done using a computer printout, email, SMS text messaging to a mobile phone, computer-generated voice annotation over a telephone, posting of the result to an internet account which the user can access later.

What is claimed is:

1. A method performed by an interactive service device, the method comprising:
   receiving, from a computing device, a media sample of a media stream, wherein the media sample comprises pre-processed characteristics of content of the media stream including fingerprint and landmark pairs that describe content and locations of the content in the media stream;
   determining a match of the media sample to stored content recordings, based at least in part on the fingerprint and landmark pairs;
   receiving information from the computing device indicative of a selection of an event from a plurality of events offered by the interactive service device, the computing device, or an event fulfillment center; and
   in response to receipt of the media sample and finding the match, triggering the selected event.

2. The method of claim 1, wherein triggering the selected event comprises providing to the computing device an option to purchase goods associated with an identity of content of the media sample via a transaction event.

3. The method of claim 2, wherein the goods comprise a song corresponding to the identity of content, a music album containing the song, or tickets to an upcoming performance by an artist of the song.

4. The method of claim 1, wherein receiving the media sample comprises receiving a sample of audio captured from an environment of the computing device.

5. The method of claim 1, wherein receiving the media sample comprises receiving a video or an image captured from an environment of the computing device.

6. The method of claim 1, wherein receiving the media sample comprises receiving a sample of an experiential environment of the computing device.

7. The method of claim 1, wherein receiving the media sample from the computing device comprises receiving a content recognition request, and the method further comprises:
  determining a usage history indicative of content of prior content recognition requests;
  determining candidates for the match of the media sample to stored content recordings;
  removing any of the candidates that are of a dissimilar genre of music as compared to genres of the content of the prior content recognition requests; and
  determining, as the match of the media sample to stored content recordings, a remaining candidate.

8. The method of claim 1, wherein determining the match of the media sample to stored content recordings comprises:
  determining a temporal position of the media sample in the media stream.

9. The method of claim 1, wherein determining the match of the media sample to stored content recordings comprises:
  determining a linear correspondence of the media sample to the stored content recordings.

10. The method of claim 1, wherein triggering the selected event comprises delivery of lyric information to the computing device that corresponds to the determined match of the media sample.

11. The method of claim 1, further comprising:
  determining a temporal position of the media sample in the media stream;
  determining a second media stream associated to the media stream; and
  providing to the computing device at least a portion of the second media stream according to the temporal position.

12. The method of claim 11, wherein the second media stream comprises lyric information that corresponds to the determined match of the media sample, and wherein providing to the computing device at least a portion of the second media stream according to the temporal position comprises providing a portion of the lyric information that corresponds to the temporal position in synchrony as lyrics are rendered in the media stream.

13. The method of claim 1, wherein triggering the selected event comprises providing to the computing device a voting service associated with an identity of content of the media sample.

14. The method of claim 1, further comprising:
  based on finding the match, requesting payment of a fee for access to the selected event; and
  based on receiving an indication of payment of the fee, triggering the selected event.

15. The method of claim 1, wherein triggering the selected event comprises providing to the computing device an advertisement associated with an identity of content of the media sample.

16. The method of claim 1, wherein in response to receipt of the media sample and finding the match, the method comprises:
  determining a user profile of a user of the computing device;
  based on the user profile, determining offers associated with an identity of content of the media sample that are targeted to the user; and
  triggering the selected event in accordance with the determined offers.

17. The method of claim 1, wherein in response to receipt of the media sample and finding the match, the method comprises:
  determining patterns of usage of the plurality of events;
  adjusting offers associated with an identity of content of the media sample based on the patterns of usage; and
  triggering the selected event in accordance with the adjusted offers.

18. The method of claim 1, wherein triggering the selected event comprises:
  providing a notification to another computing device indicating that a user of the computing device has engaged the interactive service device to identify a song.

19. The method of claim 18, further comprising:
  providing an excerpt of the song to the another computing device.

20. The method of claim 1, wherein triggering the selected event comprises:
  determining a group of users to be notified based on a user profile of a user of the computing device; and
  providing a notification to the group of users indicating that the user of the computing device has engaged the interactive service device, the computing device, or the event fulfillment center to perform the selected event.

21. The method of claim 1, wherein receiving the information from the computing device indicative of the selection of the event from the plurality of events comprises:
  determining the selection based on a pre-programmed user profile of a first user of the computing device, and wherein the selection indicates to notify a second user that the first user has engaged the interactive service device, the computing device, or the event fulfillment center to perform a song identification.

22. A non-transitory computer readable storage medium having stored therein instructions, that when executed by a computing device, cause the computing device to perform functions comprising:
  receiving a media sample of a media stream, wherein the media sample comprises pre-processed characteristics of content of the media stream including fingerprint and landmark pairs that describe content and locations of the content in the media stream;
  determining a match of the media sample to stored content recordings, based at least in part on the fingerprint and landmark pairs;
  receiving information from the computing device indicative of a selection of an event from a plurality of events offered by an interactive service device, a computing device that captured the media sample of the media stream, or an event fulfillment center; and
  in response to receipt of the media sample and finding the match, triggering the selected event.

23. The non-transitory computer readable medium of claim 22, wherein triggering the selected event comprises:
  providing a notification to another computing device indicating that a user of the computing device has engaged the interactive service device to identify a song; and
  providing an excerpt of the song to the another computing device.

24. The non-transitory computer readable medium of claim 22, wherein receiving the media sample from the computing device comprises receiving a content recognition request, and the functions further comprise:
- determining a usage history indicative of content of prior content recognition requests;
- determining candidates for the match of the media sample to stored content recordings;
- removing any of the candidates that are of a dissimilar genre of music as compared to genres of the content of the prior content recognition requests; and
- determining, as the match of the media sample to stored content recordings, a remaining candidate.

25. The non-transitory computer readable medium of claim 22, wherein triggering the selected event comprises delivery of lyric information that corresponds to the determined match of the media sample.

26. The non-transitory computer readable medium of claim 22, wherein the functions further comprise:
- determining a temporal position of the media sample in the media stream;
- determining a second media stream associated to the media stream; and
- providing to the computing device at least a portion of the second media stream according to the temporal position.

27. A method performed by an interactive service device, the method comprising:
- receiving, from a computing device, a media sample of a media stream, wherein the media sample comprises pre-processed characteristics of content of the media stream including fingerprint and landmark pairs that describe content and locations of the content in the media stream;
- determining a match of the media sample to stored content recordings, based at least in part on the fingerprint and landmark pairs;
- in response to receipt of the media sample and finding the match,
  - determining one or more users to be notified based on a user profile of a user of the computing device; and
  - providing a notification to the one or more users indicating that the user of the computing device has engaged an interactive service device to identify the media sample and indicating an entity of the identified media sample.

28. The method of claim 27, wherein receiving the media sample from the computing device comprises receiving a content recognition request, and the method further comprises:
- determining a usage history indicative of content of prior content recognition requests;
- determining candidates for the match of the media sample to stored content recordings;
- removing any of the candidates that are of a dissimilar genre of music as compared to genres of the content of the prior content recognition requests; and
- determining, as the match of the media sample to stored content recordings, a remaining candidate.

29. The method of claim 27, wherein in response to receipt of the media sample and finding the match, the method comprises:
- determining a user profile of a user of the computing device;
- based on the user profile, determining offers associated with an identity of content of the media sample that are targeted to the user; and
- triggering the selected event in accordance with the determined offers.

* * * * *